(12) United States Patent
Deeba

(10) Patent No.: US 6,912,847 B2
(45) Date of Patent: Jul. 5, 2005

(54) DIESEL ENGINE SYSTEM COMPRISING A SOOT FILTER AND LOW TEMPERATURE NOX TRAP

(75) Inventor: Michel Deeba, East Brunswick, NJ (US)

(73) Assignee: Engelhard Corporation, Iselin, NJ (US)

( * ) Notice: Subject to any disclaimer, the term of this patent is extended or adjusted under 35 U.S.C. 154(b) by 75 days.

(21) Appl. No.: 10/032,200

(22) Filed: Dec. 21, 2001

(65) Prior Publication Data

US 2003/0115859 A1 Jun. 26, 2003

(51) Int. Cl.⁷ .............................................. F01N 3/00
(52) U.S. Cl. ..................... 60/297; 60/295; 60/274; 60/301; 60/311; 423/213.2; 423/213.5
(58) Field of Search ................ 60/274, 295, 297, 60/299, 300, 301, 311; 423/213.2, 213.5, 230, 239.2, 243.08, 244.07

(56) References Cited

U.S. PATENT DOCUMENTS

| | | | |
|---|---|---|---|
| 4,902,487 A | 2/1990 | Cooper et al. | 423/215.5 |
| 5,682,740 A * | 11/1997 | Kawamura | 60/297 |
| 5,727,385 A | 3/1998 | Hepburn | 60/297 |
| 5,746,989 A * | 5/1998 | Murachi et al. | 423/212 |
| 5,874,057 A | 2/1999 | Deeba et al. | 423/239.1 |
| 5,968,861 A | 10/1999 | Feeley et al. | 502/74 |
| 5,992,142 A | 11/1999 | Pott | 60/274 |
| 6,038,854 A * | 3/2000 | Penetrante et al. | 60/297 |
| 6,051,040 A * | 4/2000 | Peter-Hoblyn | 44/358 |
| 6,074,976 A | 6/2000 | Tabata et al. | 502/74 |
| 6,080,377 A * | 6/2000 | Deeba et al. | 423/239.2 |
| 6,087,295 A | 7/2000 | Kharas et al. | 502/300 |
| 6,093,378 A * | 7/2000 | Deeba et al. | 423/213.5 |
| 6,146,602 A | 11/2000 | Narula et al. | 423/213.5 |
| 6,167,696 B1 * | 1/2001 | Maaseidvaag et al. | 60/274 |
| 6,182,443 B1 | 2/2001 | Jarvis et al. | 60/274 |
| 6,233,927 B1 * | 5/2001 | Hirota et al. | 60/297 |
| 6,314,722 B1 * | 11/2001 | Matros et al. | 60/274 |
| 6,367,246 B1 * | 4/2002 | Hirota et al. | 60/295 |

FOREIGN PATENT DOCUMENTS

| | | | |
|---|---|---|---|
| EP | 0 758 713 A1 | 2/1997 | F01N/3/02 |
| EP | 1 055 806 A2 | 11/2000 | F01N/3/08 |
| EP | 1 072 763 A1 | 1/2002 | F01N/3/08 |
| JP | 05 168857 | 7/1993 | |
| JP | 06 079137 | 3/1994 | |
| JP | 08338229 | 12/1996 | F01N/3/02 |
| WO | WO 01/12320 | 2/2001 | |

\* cited by examiner

*Primary Examiner*—Binh Q. Tran
(74) *Attorney, Agent, or Firm*—Richard A. Negin

(57) ABSTRACT

The invention provides low temperature $NO_2$ trap compositions useful for adsorbing $NO_2$ from a gas stream at lower temperatures, and releasing the $NO_2$ at higher temperatures. The low temperature trap compositions are useful for incorporation into a diesel exhaust system equipped with a soot filter. The $NO_2$ from the diesel exhaust can be stored when the exhaust temperature is cool, e.g., during startup and at times of low load, and released when the exhaust is at higher temperatures. The released $NO_2$ serves as an effective oxidant for the combustion of soot deposited on the soot filter. These temperatures are significantly lower than those required for the combustion of soot using $O_2$ as an oxidant. The methods of the invention thereby provide a method for regenerating the soot filter within operating temperature ranges typical of diesel engine exhaust systems.

19 Claims, 12 Drawing Sheets

DIESEL ENGINE SYSTEM COMPRISING A SOOT FILTER AND LOW TEMPERATURE NOX TRAP

The present invention relates to an exhaust system and method for removing pollutants from a diesel engine exhaust stream. More particularly, the present invention relates to exhaust systems and methods for removing particulate matter from diesel engine exhaust streams that contain nitrogen dioxide and particulate matter.

Regulatory agencies of various governments have mandated ever more stringent emissions standards for pollutants from diesel engines. A particular problem for treating diesel engine exhaust, as opposed to exhaust from gasoline engines, is abating levels of particulate matter. The two major components of particulate matter are the volatile organic fraction (VOF) and a soot fraction (soot). The VOF condenses on the soot in layers, and is derived from the diesel fuel and oil. The VOF can exist in diesel exhaust either as a vapor or as an aerosol (fine droplets of liquid condensate) depending on the temperature of the exhaust gas. Soot is predominately composed of particles of carbon. The particulate matter from diesel exhaust is highly respirable due to its fine particle size, which poses health risks at higher exposure levels. Moreover, the VOF contains polycyclic aromatic hydrocarbons, some of which are suspected carcinogens.

Catalysts have been designed to catalyze the oxidation of the VOF and thus at least partially reduce the particulate mass. These catalysts include platinum based catalysts which have the added benefit of oxidizing at least a portion of the hydrocarbons and carbon monoxide also present in the diesel exhaust. In addition, as disclosed in U.S. Pat. No. 5,627,124 a ceria-alumina catalyst can effectively be used to oxidize the VOF.

The soot, on the other hand, is conventionally reduced by the incorporation of a soot filter in the diesel engine exhaust system. The soot filter is composed of wire mesh, or is more commonly a porous ceramic structure. As the soot is trapped in the filter, however, back pressure in the exhaust system increases. One strategy for relieving this back pressure is to combust the soot deposited on the filter, thus unclogging the filter. Some soot filters incorporate catalysts specifically for the combustion of the soot (soot combustion catalysts). The temperatures at which soot combusts with air (containing $O_2$), however, is in excess of 500° C., which may be damaging to the soot filter depending on the accumulated soot.

One approach to rid the filter of the deposited soot particles, is disclosed in U.S. Pat. No. 4,902,487, herein incorporated by reference, wherein nitrogen dioxide ($NO_2$) present in the diesel exhaust, serves as the oxidant for the soot particles instead of oxygen at temperatures around 225–300° C. The approach can include the use of a catalyst containing a platinum group metal on a monolithic carrier to catalyze the oxidation of nitrogen oxide (NO) to $NO_2$ to provide sufficient oxidant for the combustion of the soot particles.

While the approach described in the U.S. Pat. No. 4,902,487 patent is an attractive one, the platinum-based catalysts used to oxidize NO to $NO_2$ often operate at temperatures greater than 250° C. Diesel engines, however, often have exhaust temperature in the range of 120 to 200° C. during startup, and during driving conditions which generate cooler exhaust streams. Thus, it may not be possible to generate sufficient $NO_2$ from the reaction of NO to $NO_2$ catalyzed by the platinum-based catalyst alone, while the exhaust is at lower temperatures. Approaches that provide for alternative sources of the $NO_2$ other than through the catalysis of NO to $NO_2$, when the exhaust is at lower temperatures would be desirable.

In diesel engines about 10–30% of the nitrogen oxides (NOx) is found in the form of $NO_2$. Using improvements in diesel engine technology the proportion of $NO_2$ in the diesel exhaust gas can be increased. For example, several engine modifications or ignition timing, familiar to engine experts, can be used to favor the formation of $NO_2$ over NO in the diesel exhaust. The $NO_2$ is also preferentially produced over NO in the exhaust of diesel engines at certain operating conditions, for example, at low load, when many cold zones exist that inhibit the decomposition of $NO_2$ to NO. $NO_2$ is also formed at low speed where the gases reside longer in the presence of oxygen.

Even with higher levels of $NO_2$ in the exhaust stream due to the improvements in diesel engine technology, the $NO_2$ may not effectively combust the soot deposited on the soot filter at lower exhaust temperatures. At lower exhaust temperatures the soot may not combust even when the combustion is aided by a soot combustion catalyst. Moreover, the $NO_2$, formed at lower temperatures, requires additional strategies and devices such as lean NOx catalysts and a reductant source (e.g., a hydrocarbon source such as toluene or propylene) to treat the $NO_2$ before it is vented to the atmosphere. These strategies and devices are often costly and difficult to implement into diesel exhaust systems. It would be particularly advantageous to design strategies and exhaust systems that would effectively utilize the $NO_2$ in the diesel engine exhaust stream at lower temperatures, such as for the combustion of soot.

SUMMARY OF THE INVENTION

In one embodiment, the invention relates to a diesel engine exhaust system containing low temperature $NO_2$ trap material and a soot filter. The low temperature $NO_2$ trap material is deposited on a carrier upstream and in train with the soot filter. Preferably, the low temperature $NO_2$ trap material contains acidic zeolites or base metal-exchanged zeolites. The exhaust systems of the invention typically contain a diesel oxidation catalyst disposed upstream of the soot filter.

The zeolites are preferably selected from ZSM-5, ETS-10, Y zeolite, Beta zeolite, ferrierite, mordenite, titanium silicates, and aluminum phosphates. Base metals include on or more cations of Mn, Cu, Fe, Co, W, Re, Sn, Ag, Zn, Mg, Li, Na, K, Cs, Nd, and Pr.

In some embodiments the low temperature $NO_2$ trap material is deposited on a carrier that is interposed and in train with the diesel oxidation catalyst and the soot filter. The carrier with the deposited low temperature $NO_2$ trap material is typically a flow through carrier, disposed upstream of the soot filter. In one embodiment of the invention, the exhaust system has a canister, housing both the low temperature $NO_2$ trap material and the soot filter.

In preferred embodiments, the soot filter is a ceramic monolithic structure having an upstream axial end and a downstream axial end. The structure contains parallel flow channels with macro porous walls. Channels having an opening at the upstream axial end are closed to the gas stream at the downstream axial end. The channels having an opening at the downstream axial end are closed to the gas stream at the upstream axial end. Upstream and downstream sides of the channel walls are defined by the construction.

In some embodiments catalyst compositions are coated on the soot filter. In a preferred exhaust system the catalyst composition is deposited on the downstream side of the channel walls of the soot filter. The catalyst composition may be a lean NOx catalyst composition or a composition effective for the combustion of unburned hydrocarbons and carbon monoxide.

In another aspect, the invention relates to a method of treating a diesel exhaust stream containing $NO_2$ and soot. The method includes the step of passing the exhaust stream through the exhaust system containing low temperature $NO_2$ trap material and a soot filter. In the method at least some of the $NO_2$ is adsorbed onto the $NO_2$ trap material, and at least some of the soot is adsorbed on the soot filter. The method includes the step of desorbing at least some of the adsorbed $NO_2$ from the $NO_2$ trap material as the exhaust temperature increases. Finally, at least some of the adsorbed soot is oxidized by the desorbed $NO_2$.

The invention also relates to a method for treating a diesel exhaust stream containing $NO_2$ and unburned hydrocarbons. The method includes the step of passing the exhaust stream through a diesel engine exhaust system containing a soot filter and low temperature $NO_2$ trap material deposited on a carrier upstream of the soot filter. In the method, at least some of the $NO_2$ is adsorbed onto the $NO_2$ trap material and at least some of the unburned hydrocarbons is adsorbed onto the $NO_2$ trap material. As the $NO_2$ trap material is heated, at least some of the adsorbed $NO_2$ and some of the unburned hydrocarbons are desorbed from the $NO_2$ trap material. Finally, at least some of the unburned hydrocarbons are oxidized with the desorbed $NO_2$. Preferably, the low temperature $NO_2$ trap material comprises zeolites selected from the group consisting of acidic zeolites and base-metal exchanged zeolites In yet another aspect, the invention relates to a method for removing $NO_2$ from an inlet gas stream. In the method, the inlet gas stream is contacted with low temperature $NO_2$ trap material to adsorb at least some of the $NO_2$ onto the trap material.

In another aspect, the invention provides a composition for adsorbing gaseous components from an inlet gas stream. The composition contains zeolites exchanged with base metal cations. Zeolites include one or more of ZSM-5, ferrierite, titanium silicates, aluminum phosphates, gallosilicates and borosilicates. Preferably, the zeolites are titanium silicates (particularly ETS-10). Base metals include one or more of the cations of Mn, Cu, Fe, Co, W, Re, Sn, Ag, Zn, Mg, Li, Na, K, Cs, Nd and Pr. Preferred base metals include Co and Mn.

DETAILED DESCRIPTION OF THE INVENTION

Definitions

Figure 1:
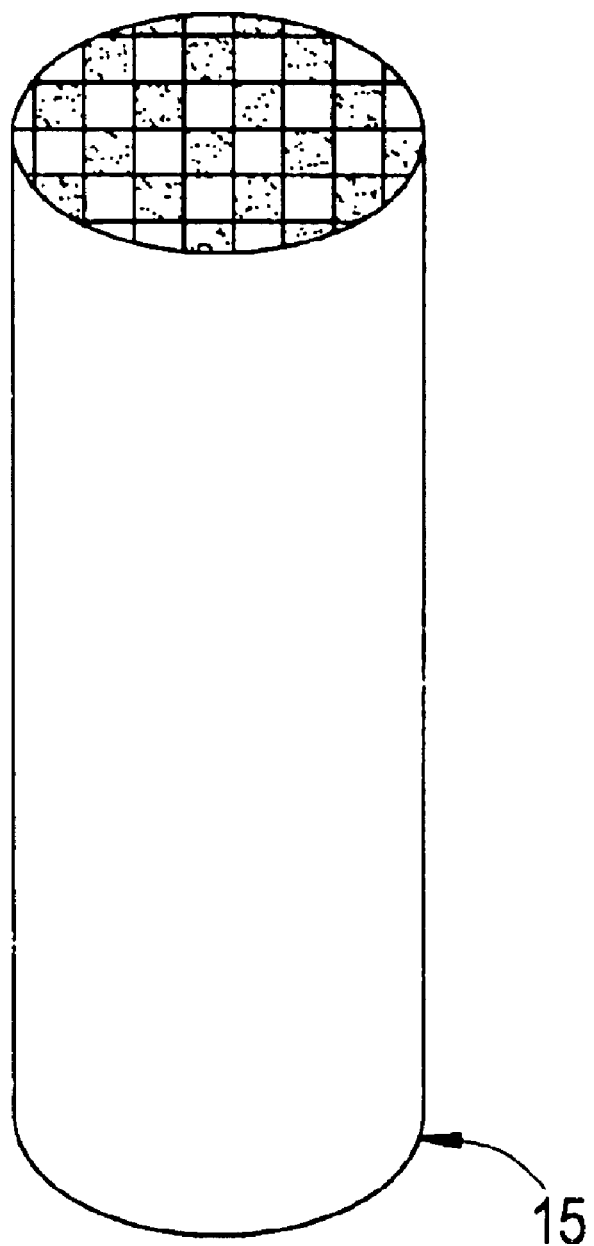
FIG. 1 is a depiction of a soot filter.

The following terms shall have, for the purposes of this application, the respective meanings set forth below.

"inlet temperature" shall mean the temperature of the exhaust, test gas or other stream being treated immediately prior to initial contact of the exhaust, test gas or other stream with $NO_2$ trap material.

"supports" refer to particulate materials that are part of the $NO_2$ trap or catalyst composition including inorganic oxides including oxide support such as activated alumina, zirconia, titania, cerium oxide and silica.

In accordance with the invention, Applicants have found it advantageous to equip a diesel engine exhaust system with low temperature $NO_2$ trap material, and a soot filter to remove particulate matter, particularly the soot fraction. The low temperature trap material adsorbs $NO_2$ from the exhaust at lower exhaust temperatures, and releases the $NO_2$ at higher temperatures. As the temperature of the exhaust stream reaches the reaction temperature necessary to combust the soot with the $NO_2$ gas, the released $NO_2$ serves as a convenient source of oxidant for combustion of the soot trapped on the soot filter. In addition, the $NO_2$ collected at the lower temperatures, is effectively treated at higher temperatures by reaction with soot without additional provisions that specifically address only NOx abatement.

In the invention, low temperature $NO_2$ trap materials are used in combination with the soot filter. In general, the trap materials are deposited on a carrier that is upstream (as sensed by the exhaust gas stream) of the soot filter.

In preferred embodiments, the low temperature $NO_2$ trap materials are used in combination with catalytic materials that are typically present in diesel engine exhaust gas platforms. Such catalyst materials include materials effective to aid the combustion of gaseous pollutants, for example, unburned hydrocarbons, carbon monoxide and the VOF; as well as materials effective to aid in the combustion of the soot fraction. In some embodiments, the low temperature trap materials are physically segregated from the catalyst materials, while in other embodiments the trap materials are used in admixture with the catalyst materials.

The $NO_2$ trap material used in the invention is preferably low temperature trap material. As used herein the term low-temperature trap material refers to trap material that adsorbs $NO_2$ at lower temperatures and releases the stored $NO_2$ into the exhaust stream at higher temperatures to regenerate the $NO_2$ trap material. By varying the composition of the low temperature $NO_2$ trap, the temperature at which the trap stores $NO_2$ and also releases $NO_2$ can be changed. This property advantageously provides a flexible approach adaptable to various exhaust compositions and temperatures that result from different diesel engine platforms.

The invention preferably uses low temperature $NO_2$ trap materials that release the stored $NO_2$ with increasing temperature. The trap materials of the invention contrast with conventional $NO_2$ trap materials such as alkali and alkaline earth metal oxides such as barium oxide and strontium oxide that rely on lowering the air/fuel ratio (A/F ratio) in the exhaust gas stream to trigger the release of the stored $NO_2$. Low temperature $NO_2$ trap materials are advantageous since A/F ratios in the exhaust from diesel engines are almost always on the lean side.

Preferred low temperature $NO_2$ trap materials include molecular sieves exchanged with either a proton (H+) or a cation of a base metal. The base metal-exchanged zeolites used in the invention effectively trap $NO_2$ at lower temperature and release the $NO_2$ when the exhaust temperatures are sufficiently high enough to combust soot deposited on the soot filter with the released $NO_2$. Zeolites used in the invention preferably include a three-dimensional zeolites characterized by pore openings whose smallest cross-sectional dimension are at least about 5 Angstroms. The zeolites preferably have a silicon to aluminum ratio ("Si:Al atomic ratio") of greater than 5, and typically greater than 25, e.g., with a useful Si:Al ratio of from about 5 to 400.

In some embodiments, the zeolites are crystalline materials which are made up of a network of $SiO_4$ and $M^2O_4$ tetrahedrons, wherein $M^2$ is a trivalent element which, together with the Si, forms the oxidic skeleton of the zeolite. The individual tetrahedrons are attached to one another by oxygen bridges via the corners of the tetrahedrons and form a three-dimensional network uniformly permeated by passages and voids. The individual zeolite structures differ from one another in the arrangement and size of the passages and voids and in their composition. Exchangeable cations are incorporated to compensate the negative charge of the lattice which arises out of the $M^2$ component. $M^2$ is often aluminum, although it may be partly or completely replaced by other trivalent elements. Preferably, the trivalent element comprises at least one metal selected from the group consisting of Al, B, Ga, In, Fe, Cr, V, As and Sb. Zeolites particularly useful in accordance with the invention include crystalline aluminosilicates including ZSM-5, Y zeolite, Beta zeolite, ferrierite, and mordenite. Gallo- and borosilicates can also be used.

In other embodiments, the zeolites include titanium silicates such as ETS-10. In addition, aluminum phosphates can be used.

Useful cations that are incorporated into the zeolite by ion-exchange include cations of hydrogen, Mn, Cu, Fe, Co, W, Re, Sn, Ag, Zn, Mg, Li, Na, K, Cs, Nd, and Pr. In addition, combinations of metal cations can be prepared by ion-exchange of the zeolites and are useful in the invention, for example, a combination of Co and Mn cations. Preferably the zeolite is exchanged with either a proton (H+) or a cation of Mn, Fe, Cu or Co.

The zeolite material can be proton exchanged by any manner. Thus, for example, a proton exchanged zeolite, e.g., ZSM-5, is prepared by exchanging a precursor zeolite, e.g., Na ZSM-5, using an acidic solution, e.g., an aqueous solution with a pH of about 3. The resulting slurry can be combined with other components of the washcoat and is comminuted by, for example, a ball-mill.

Preferably, the metal cations are incorporated into the zeolite material both by ion exchange and/or precipitation. This incorporation can be achieved in a conventional manner, i.e., by the immersion of the zeolite material into a solution containing soluble salts of the metal species. The pH of the solution can be adjusted, e.g., by the addition of ammonium hydroxide, to induce precipitation of the catalytically active metal cations onto the zeolite material as well. Thus, for example, ZSM-5 zeolite is immersed in a solution containing a soluble salt, e.g., copper nitrate, for a time sufficient to allow the incorporation of the copper cations into the zeolite material by ion exchange, and then ammonium hydroxide is added to incorporate the copper ions in the solution onto the zeolite material by precipitation. The zeolite material can then be washed, dried and calcined.

Generally, ion exchange of the metal cations into the zeolite material is carried out at room temperature, or at a temperature up to 80° C. over a period of 1 to 24 hours, at a pH of about 3–7. The resulting material can be dried at about 100–120° C. overnight, and calcined at about 450–550° C.

The zeolite material prepared as described above, serves as effective $NO_2$ trap material that adsorbs $NO_2$ from a gas stream at lower temperature, e.g., ambient (about 25° C.) to about 150–200° C. and then releases the $NO_2$ at higher temperatures, e.g., above 175–200° C. Preferably the trap material absorbs $NO_2$ from ambient to at least 130° C., and releases it at a temperature that is at least above 175–200° C. The temperature at which the $NO_2$ is effectively stored and released can be adjusted by changing the composition of the zeolite trap material. In other words, the zeolite itself and the cation incorporated therein affect the storage and release temperatures. Thus, the temperature ranges in which the zeolite material stores and releases $NO_2$ can be advantageously tuned to a particular diesel exhaust system's performance requirements.

Certain of the zeolite materials used as $NO_2$ traps described above also simultaneously trap unburned hydrocarbons at lower temperatures, e.g., ambient to about 150° C. Some of these properties are described in U.S. Pat. No. 6,093,378, herein incorporated by reference. The stored hydrocarbons are released from the zeolite trap materials at higher temperatures, which often overlap with the temperature ranges at which the $NO_2$ is released from the zeolite materials. $NO_2$ serves as an effective oxidant for the combustion of unburned hydrocarbons in addition to the soot fraction of the exhaust. While not being bound by theory, it is believed that at least some of the trapped hydrocarbons are either oxidized within the zeolite or released from the zeolite when the temperature of the catalyst composition is high enough to effectively catalyze oxidation of the trapped hydrocarbons, or both. The trap materials of the present invention are therefore able to trap hydrocarbon molecules which might otherwise, during periods when the exhaust gas is relatively cool, escape untreated from the exhaust system. Many of the zeolite trap materials disclosed herein are therefore simultaneously useful for the abatement of hydrocarbons in addition to the $NO_2$ and the soot fraction.

The $NO_2$ trap materials of the invention are preferably formed as components of washcoat compositions, which are deposited on metallic or ceramic honeycomb carriers. The washcoat compositions of the present invention can optionally contain binders for the zeolite. Preferred binders are alumina, silica, silica-alumina and zirconia. Typically the amount of binder is from 1 to 10, and preferably from 3 to 7 and most preferably 3 to 5 weight percent based on the weight of the zeolite. Other materials useful as binders include titania and rare earth materials such as ceria and their precursors. Materials useful as supports (reviewed below) can also serve as binders.

The washcoat composition can also include a zeolite stabilizer such as a lanthanum, cerium, praseodymium, neodymium, samarium or barium salts, which upon calcination are converted to the respective oxides.

In a typical preparation of a washcoat composition, water is added to the zeolite along with milled alumina having a particle size of 5–10 microns. A sufficient volume of water is added so that that the resulting slurry has a solids content of about 30–35% solids. A high shear mixer is used to disperse the zeolite with the binder, e.g., an alumina binder. The $NO_2$ trap material typically comprises about 80% of the total solid content of the slurry. The slurry is coated on a carrier such as a flow through carrier (also referred to as a honeycomb carrier) to a level of about 0.25–1.5 $g/in^3$ and preferably about 0.5–1.25 $g/in^3$. On flow through carriers, about 2–4 $g/in^3$ of the washcoat can be applied. After coating, the coated carrier is dried at 120° C. and calcined between 450–550° C.

In certain embodiments of the invention the $NO_2$ trap material is incorporated in admixture with catalytic washcoat compositions. These catalytic washcoat compositions, containing both the trap material and platinum group metals, can be deposited, for example, on a suitable flow through carrier to form the diesel oxidation catalyst.

The catalyst washcoat compositions that include the low temperature $NO_2$ trap materials of the present invention can be made by any suitable method. A preferred method includes preparing a solution of water-soluble, catalytic metal component, and finely-divided, high surface area, refractory oxide which is sufficiently dry to absorb essentially all of the solution to form a slurry. The catalytic metal component is preferably comminuted in the slurry. In particularly preferred embodiments, the slurry is comminuted to result in substantially all of the solids having particle sizes of less than about 10 micrometers in average diameter. The supported catalytic metal component in the resulting slurry can be converted to a water insoluble form by a fixing step. The catalytic metal component can be converted to insoluble form thermally, chemically or by calcining. The catalytic metal can be thermally fixed to the support in air, preferably at about 50° C. to 550° C. for about 0.5 to 2.0 hours.

A slurry containing the fixed catalytic metal component in a suitable solvent, preferably water, can be combined with low temperature trap material components and various other additives such as promoters and stabilizers and comminuted as a slurry to provide solid particles that are preferably of a size of less than about 10 microns. The slurry can be used to coat a carrier, typically having a low surface area, and the composite is dried and can be calcined.

The washcoats containing the low temperature $NO_2$ trap material are deposited on to flow through carriers. A flow through carrier contains a plurality of fine, parallel gas flow passages extending along its axial length from an inlet to an outlet face of the carrier, so that the passages are open to fluid flow therethrough. The passages, which are essentially straight from their fluid inlet to their fluid outlet, are defined by walls on which the catalytic material is coated as a washcoat so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures can contain from about 60 to about 600 or more gas inlet openings ("cells") per square inch ("cpsi") of cross section. The ceramic carrier can be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb can be made of a refractory metal such as a stainless steel or other suitable iron based corrosion resistant alloys.

The exhaust systems of the invention contain a soot filter to trap the particulate matter and prevent the material from venting directly to the atmosphere. Soot filters can be, for example, metal wire mesh structures formed, for example, from stainless steel. The mesh structures are often coated with alumina.

Alternatively and preferably, the soot filter is a ceramic wallflow filter. Typical ceramic soot filters are composed of refractory materials such as cordierite or silicon-carbide. Wallflow filter elements are particularly useful to filter particulate matter from diesel engine exhaust gases. A common ceramic wallflow filter construction is a multi-channel honeycomb structure (15) having the ends of alternate channels on the upstream and downstream sides of the honeycomb structure plugged (see FIG. 1). This construction results in a checkerboard-type pattern on either end. Channels plugged on the upstream or inlet axial end are open on the downstream or outlet axial end. This permits the exhaust gas with the entrained particulate matter to enter the open upstream channels, flow through the porous walls and exit through the channels having open downstream axial ends. The particulate matter is thereby filtered on to the walls of the filter. The gas pressure forces the exhaust gas through the porous structural walls into the channels closed at the upstream axial end and open at the downstream axial end.

While it will be apparent to those of ordinary skill in the art that $NO_2$ can combust the particulate matter without the aid of catalyst, the wallflow filters can contain catalytic agents on various catalyst supports on or in the filter. The catalytic agents can promote the combustion of the particulate matter at lower temperatures, e.g., at 150–300° C. The catalytic agents can be, for example, deposited on the soot filter using catalytic washcoats. Catalytic agents effective in combusting the particulate matter with nitrogen dioxide include platinum on a catalyst support (e.g., activated alumina, zirconia). Other catalytic agents effective for promoting the combustion of soot include $V_2O_5$, $WO_3$, $Ag_2O$, $Re_2O_7$, $CeO_2$, $FeO_2$, $MnO_2$, NiO, CuO and combinations thereof. These catalytic agents can be used alone or on supports such as alumina or zirconia.

In some embodiments it is preferable to deposit a lean NOx catalyst on the soot filter to promote the combustion of unburned hydrocarbons that with $NO_2$ or $O_2$. At higher temperatures, preferably at temperatures above at least 150° C., the $NO_2$ serves as an effective oxidant for the unburned hydrocarbon. Lean NOx catalysts are known in the art, and include zeolite materials doped with platinum or rhodium. A preferred lean NOx catalyst is platinum doped ZSM-5.

The exhaust system of the invention can include a diesel oxidation catalyst. Oxidation catalysts comprising a platinum group metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts, or more simply catalytic converters or catalyzers, which are placed in the exhaust train of diesel power systems to treat the exhaust before it vents to the atmosphere. Typically, the diesel oxidation catalysts are formed on ceramic or metallic carriers (such as the flow through monolith carriers described above) upon which catalytic washcoat compositions are deposited. The catalytic washcoats generally contain base metal catalytic agents, platinum group metal catalytic agents or combinations of both that are supported on refractory metal oxides, e.g., activated alumina. Preferred base metal catalytic agents include rare earth metal oxides, particularly lanthanum oxide, cerium oxide and praseodymium oxide. Preferred platinum group metal catalytic agents include platinum, palladium, and rhodium.

Preferably the diesel oxidation catalysts used in the invention include at least one platinum group metal, so that the conversions of NO to $NO_2$ are also catalyzed as described in U.S. Pat. No. 4,902,482. The platinum group metal-catalyzed conversion of NO supplements the levels of $NO_2$ oxidant in the exhaust stream to ensure adequate combustion of the soot deposited on the soot filter downstream. The catalytic washcoat compositions also typically contain other additives such as promoters and stabilizers.

Figure 2:
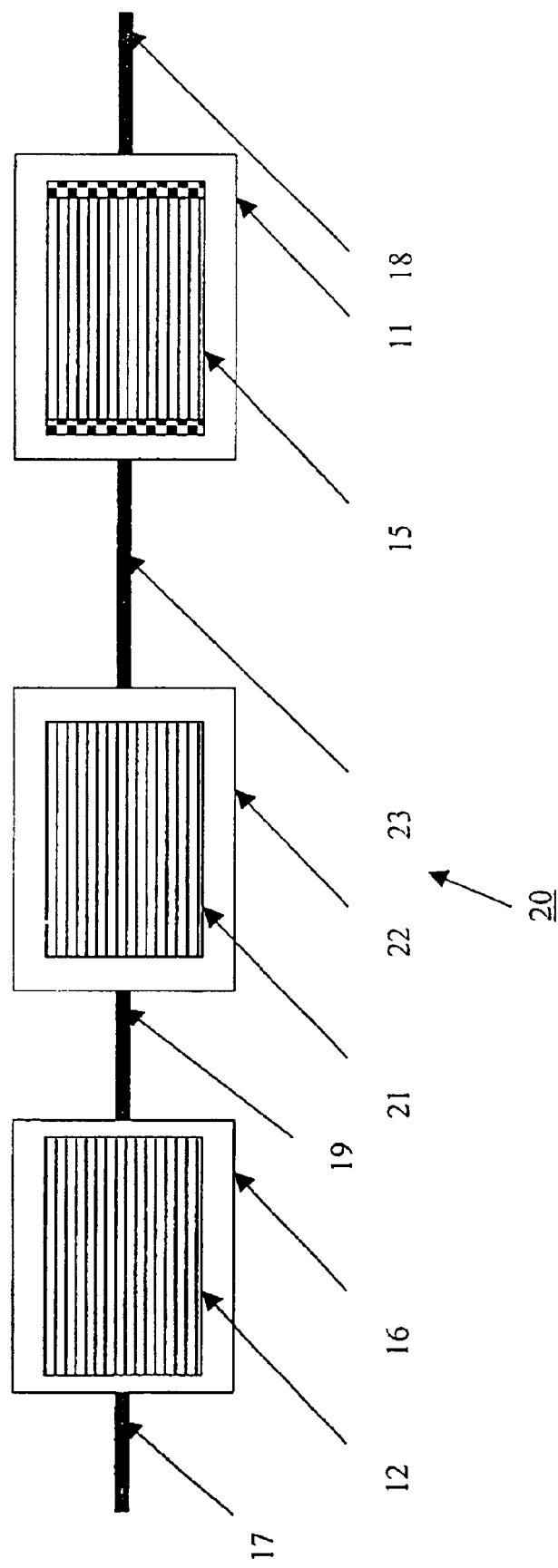
FIG. 2 depicts one embodiment of a diesel engine exhaust system of the invention with a low temperature $NO_2$ trap housed in a discrete canister.

In one embodiment of the exhaust system (20) depicted in FIG. 2, the $NO_2$ trap material in the form of a layer deposited on a separate flow through carrier (21) that is interposed and in train with an upstream diesel oxidation catalyst (12) and a downstream soot filter (15). Exhaust gases flow from the engine to the canister (16) housing the diesel oxidation catalyst through the engine exhaust gas line (17). From the diesel oxidation catalyst (12) the exhaust gases flow through an upstream exhaust gas line (19) to a canister (22) housing the flow through carrier (21) with the low temperature $NO_2$ trap material. Preferably, the carrier (21) is a ceramic or metallic carrier having a plurality of channels along its longitudinal axis. From the carrier (21) the exhaust gases flow through a downstream exhaust gas line (13) to a canister (11) housing a soot filter (15). In this configuration, once the exhaust temperature has reached the temperature at which the low temperature $NO_2$ trap material releases $NO_2$, the released $NO_2$ can be utilized as an oxidant to combust the soot in the soot filter. An exhaust gas line (18) vents the treated exhaust from the soot filter to a muffler (not shown) and then to the atmosphere.

Figure 3:
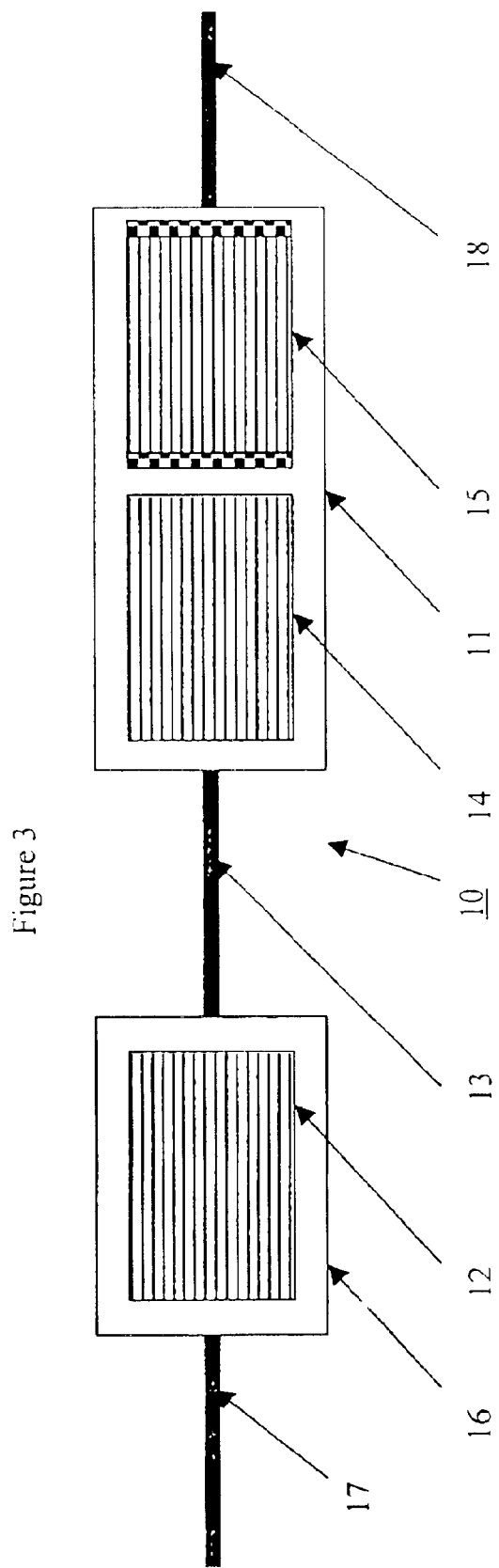
FIG. 3 depicts one embodiment of a diesel engine exhaust system of the invention with a single canister housing the low temperature $NO_2$ trap and the soot filter.

In another embodiment of the invention as depicted in FIG. 3, the trap material and the soot filter are housed in the same canister (11) in the diesel engine exhaust train (10). The canister (11) is placed downstream of the diesel oxidation catalyst (12). Exhaust gases flow from the engine to the canister (16) housing the diesel oxidation catalyst through the engine exhaust gas line (17). From the diesel oxidation catalyst (12) the exhaust gases flow through the exhaust gas line (13) to a canister (11) housing both a separate carrier (14) coated with $NO_2$ trap material and a soot filter (15). The $NO_2$ trap is formed by coating a carrier (e.g, ceramic monolith carrier) with a washcoat composition containing the trap material. The $NO_2$ trap is placed immediately adjacent to and upstream of the soot filter. In this configuration, once the exhaust temperature has reached the temperature at which the low temperature $NO_2$ trap material releases $NO_2$, the released $NO_2$ can be utilized as an oxidant to combust the soot in the soot filter. An exhaust gas line (18) vents the treated exhaust from the soot filter to a muffler and then to the atmosphere.

Figure 4:
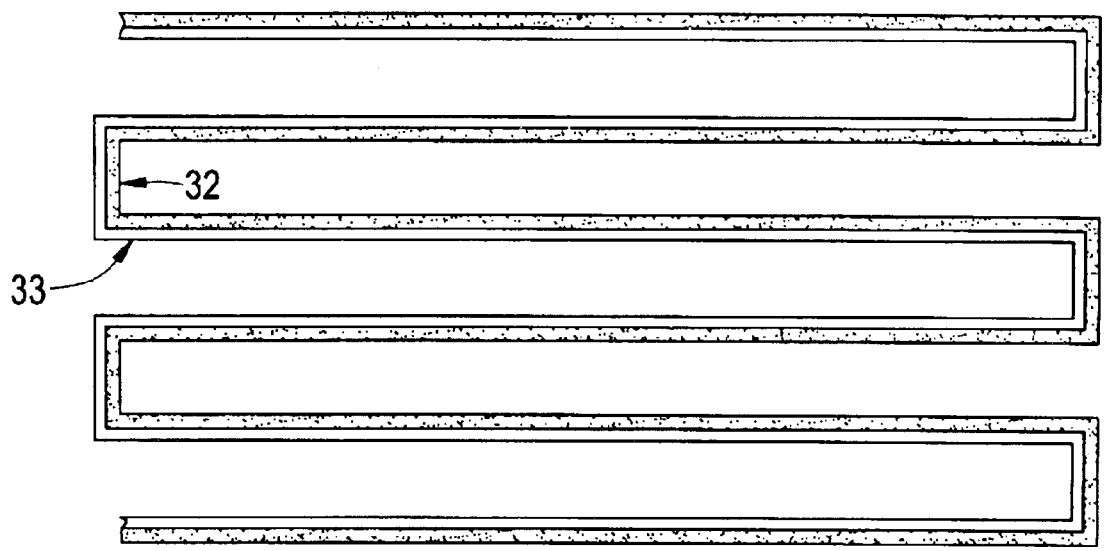
FIG. 4 depicts a sectional view of a soot filter having a catalyst coating on the upstream side of the channel walls.

In certain embodiments, a layer (32) containing a catalyst effective for the oxidation of soot (e.g., $V_2O_5$) can be deposited on the upstream side of the walls of the soot filter (33) as depicted in the sectional view of the soot filter in FIG. 4. The downstream side of the soot filter may remain uncoated as depicted in FIG. 4, or the downstream side of the soot filter can be coated with a catalyst washcoat composition (34) (preferably containing platinum group metals), effective to combust unburned hydrocarbons and carbon monoxide, as depicted in the sectional view of the soot filter in FIG. 5. This alternate coating architecture depicted in FIG. 5 has the advantage that carbon monoxide produced during the combustion of the soot is converted to carbon dioxide (catalyzed by the platinum group metals deposited on the downstream side of the channel of the soot filter) before being emitted to the atmosphere. In other embodiments, the channel walls (32) remain uncoated on the upstream side, and the downstream side of the channel walls contain a catalyst layer (34) as depicted in FIG. 6.

Figure 5:
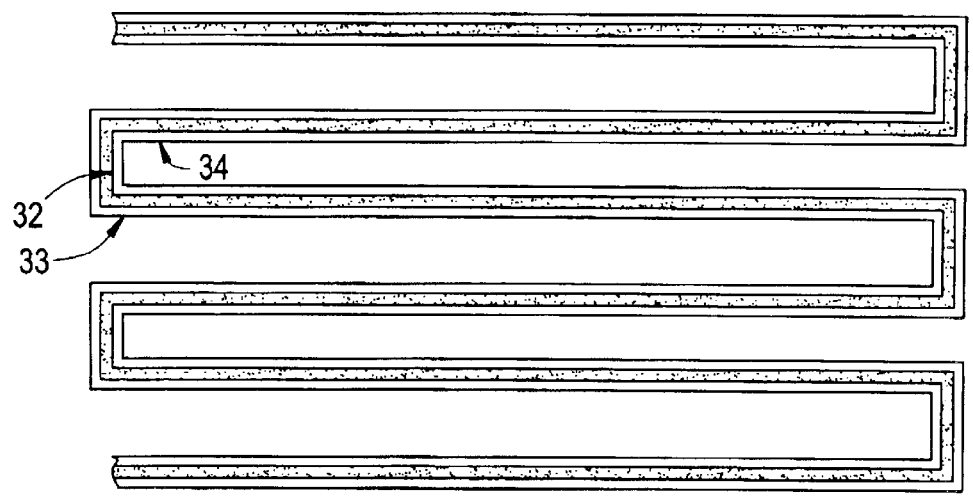
FIG. 5 depicts a sectional view of a soot filter having a first catalyst coating on the upstream side and a second catalyst coating on the downstream side of the channel walls.
Figure 6:
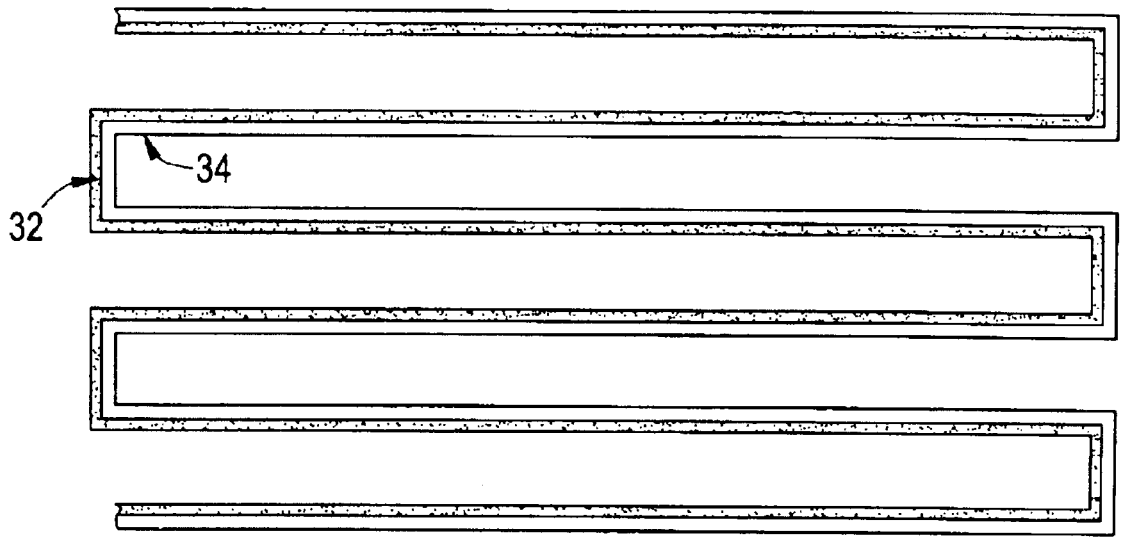
FIG. 6 depicts a sectional view of a soot filter having a catalyst coating on the downstream side of the channel walls.

In certain embodiments, the coating architectures depicted in FIG. 5 or 6 can also be used to deposit a lean NOx catalyst composition on the soot filter. For example, a washcoat containing platinum doped ZSM-5 can be deposited on the downstream side of the channel walls of the soot filter to aid in the combustion of unburned hydrocarbons. In this configuration, the hydrocarbons and $NO_2$ are trapped in the zeolite material deposited on a carrier upstream of the soot filter at cooler exhaust temperatures. As the temperature rises, the hydrocarbons and $NO_2$ are released, pass through the soot filter walls, and are reacted in the layer containing the lean NOx catalyst deposited on the downstream side of the channel walls.

To prepare a coated soot filter having the coating architecture depicted in FIG. 4, the upstream axial end of the soot filter is dipped into a reservoir containing a washcoat composition containing a desired catalyst material. Preferably, the volume of the coating slurry is adjusted so that the level of the liquid in the reservoir remains below the downstream axial end of the soot filter. This precaution ensures that only the upstream side of the channel walls of the soot filter are coated with the desired catalyst material. The soot filter is then typically dried and calcined.

In embodiments wherein the downstream side of the channel walls of the soot filter are also coated with a second catalyst washcoat composition as in the architecture depicted in FIG. 5, the coated soot filter described in FIG. 4 is further processed. The downstream axial end of the soot filter is dipped into a reservoir containing a washcoat containing a second catalyst composition. Here again, the volume of the coating slurry in the reservoir is adjusted so that the level of the liquid is below the upstream axial end of the soot filter to ensure that only the downstream side of the channel walls are coated with the second catalyst composition. The soot filter is then dried and calcined.

In addition to diesel engine exhaust system applications, the low temperature $NO_2$ trap materials of the invention can also be used in other applications where the removal of $NO_2$ from an inlet gas stream is desirable. For example, the trap materials can be used for removing $NO_2$ from flue gases and other stationary sources. The trap materials can conveniently be regenerated by heating to temperatures effective to release the adsorbed $NO_2$.

The following examples further illustrate the present invention, but of course, should not be construed as in any way limiting its scope.

For economy of expression, the trap materials are referred to herein as "% M/zeolite". In these expressions, the "% M" refers to the weight percentage of the exchanged metal cation relative to the weight of the combined metal and zeolite. The "zeolite" refers to the specific zeolite used in the composition. Thus, for example, a 3% Mn/ETS-10 zeolite refers to ETS-10 zeolite material containing 3% by weight of manganese cation.

The concentrations of the individual components of the test gas compositions are referred to in the examples as either percentage by volume or parts-per-million (ppm) of the test gas composition.

EXAMPLE 1

Preparation of the Trap

The low temperature $NO_2$ trap materials were prepared using the following general procedure: A metal salt solution containing the metal to be exchanged, is prepared in about 300 g of water to give a predetermined amount of the metal on the corresponding zeolites. 100 g of ammonium form zeolite was then added to the metal salt solution and stirred for 2 hours at ambient conditions. After 2 hours a predetermined amount of ammonium hydroxide solution was added to precipitate the excess metal in the solution (pH about 8–9). The exchanged zeolite was then filtered out and washed with about 500 mL of water. The filtrate was then made into a slurry using about 10 g of alumina as a binder.

The slurry contained about 30–35% solids, and was coated onto 0.5"×1.0" cordierite ceramic 400 cpsi carriers to achieve a loading of 2 g/in$^3$. The coated carriers were then dried at 100° C. for 2 hours and calcined at 550° C. for 1 hour in dry air. This procedure was used to prepare 3% Mn/ZSM-5, 3% Mn/ETS-10, 3% Mn 3%Co/ETS-10, 5% Fe/ZSM-5, 3% Cu/ZSM-5, and 3% Mn/Y zeolite.

In the case of mixed oxides the corresponding metal solution (e.g., Co or Mn nitrate salt solutions) was used to incorporate a desired metal concentration in the zeolite using the same procedure outlined above.

EXAMPLE 2

Testing Conditions for Zeolite Traps

Testing conditions for the zeolite traps are generally described herein. A honeycomb carrier of 0.5 in diameter with a 1 in length was packed tightly in a quartz reactor where a gas feed with a total flow of about 1–1.5 L/min was introduced, usually at room temperature, to give a GHSV of about 30,000–45,000 hr$^{-1}$. The gas composition of the feed typically contained 250 ppm $NO_2$, 1000 ppm Cl as toluene or propylene, 20 ppm $SO_2$, 1.5% water, 5% $O_2$ and the balance was $N_2$. The level of water depended upon the procedure used and will be indicated in each example. To obtain 1.5% water, air was bubbled into a 1 L container kept at room temperature to achieve complete saturation (100% humidity). The 10% steam in the feed was obtained using a syringe pump. Detection of the NOx in the outlet gas stream was achieved by chemiluminescence techniques. The disappearance of $NO_2$ was measured relative to the amount of fed NOx ($NOx_{in}-NOx_{out}/NOx_{in}*100$).

EXAMPLE 3

Storage and Release Properties of a Mn/ETS-10 Trap

Figure 7:
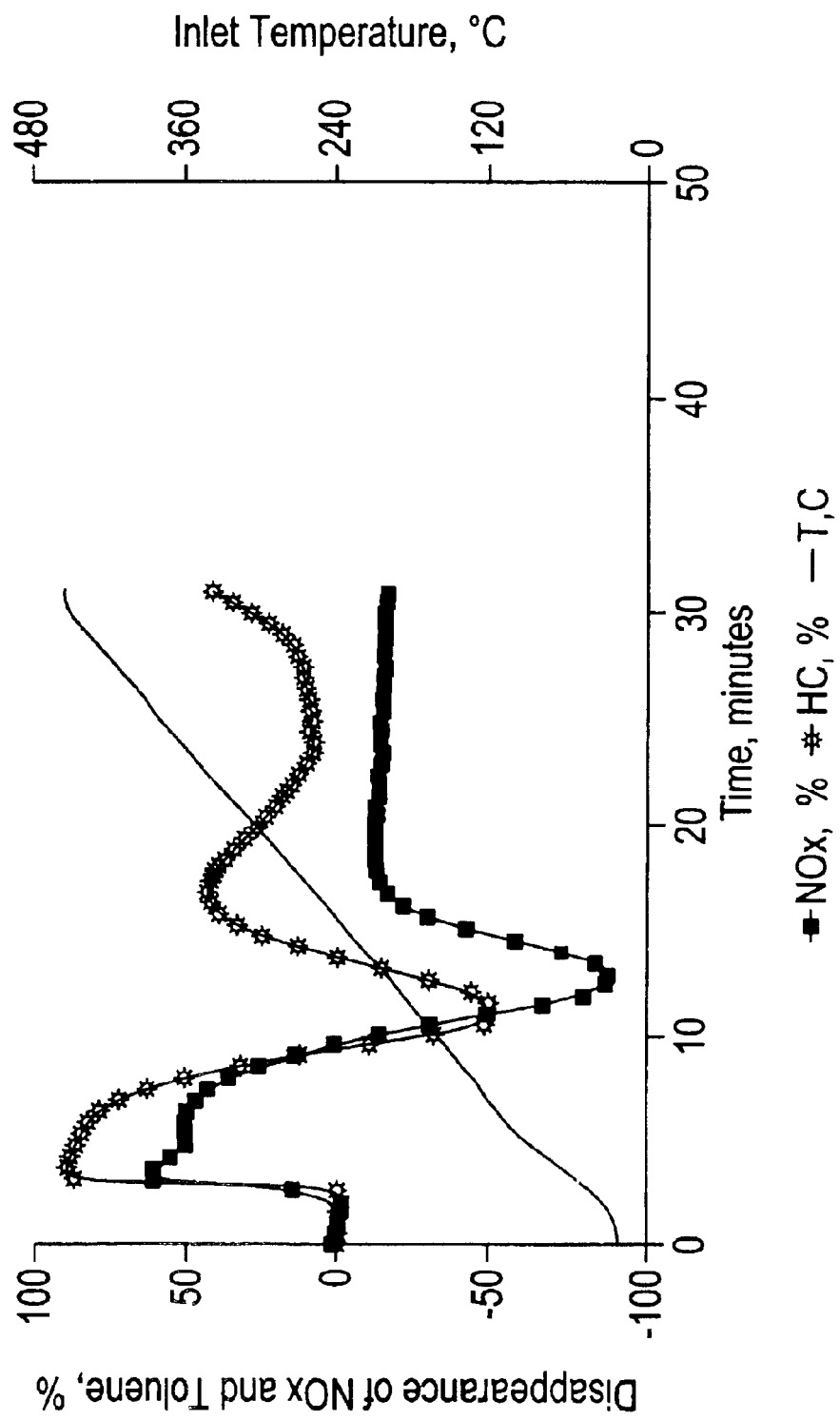
FIG. 7 illustrates the trapping and release of $NO_2$ by a carrier coated with a washcoat composition containing ETS-10 zeolite ion-exchanged with 3 wt. % manganese.

ETS-10 is a titanium silicate type molecular sieve whose preparation is described in U.S. Pat. Nos. 4,853,202 and 5,244,650, herein incorporated by reference. These are large port size molecular sieves. FIG. 7 shows the $NO_2$ storage and release of a 3 wt. % Mn exchanged ETS-10 trap (Mn/ETS-10) material coated on honeycomb carrier in a gas stream containing $NO_2$ with increasing time. The gas feed contained water saturated air (about 1.5% water), 250 ppm $NO_2$, 1000 ppm toluene, 20 ppm $SO_2$, 15% $O_2$ and the balance was $N_2$. The gas feed was introduced into the reactor at about 30° C. The temperature of the gas feed was increased at a rate of 13° C./min from ambient (about 25° C.) to about 450° C. over a 30 minute time period. In FIG. 7, the left ordinate corresponds to the percentage disappearance of the NOx and the toluene, the right ordinate corresponds to the inlet temperature and the abscissa corresponds to the time in minutes. The solid curve represents the inlet temperature, the curve containing squares represents the NOx, and the curve containing the circles represents the toluene.

The Mn/ETS-10 trap material shows $NO_2$ absorbance at 30 to 120° C. with an efficiency of over 60% for a period of about 5 minutes. The $NO_2$ adsorption efficiency dropped with increasing catalyst temperature to 150° C. The $NO_2$ was released at temperatures greater than 150° C. with a maximum release efficiency of 100% (measured at −100%) occurring at 200° C. Complete regeneration of the trap occurred at about 240° C.

Another experiment demonstrates that the Mn/ETS-10 trap material has a high $NO_2$ adsorption capacity at 120° C., and that the trap can be regenerated in the temperature range of 180–250° C. The results of the experiment are graphically presented in FIG. 8, whose ordinates, and abscissa correspond to the same parameters as those described for FIG. 7. The solid curve represents the inlet temperature, the curve containing squares represents the NOx, and the curve containing the circles represents the toluene. The test was performed under steady state conditions at 120° C. with a gas feed containing water-saturated air (1.5% water) and 20 ppm $SO_2$.

Figure 8:
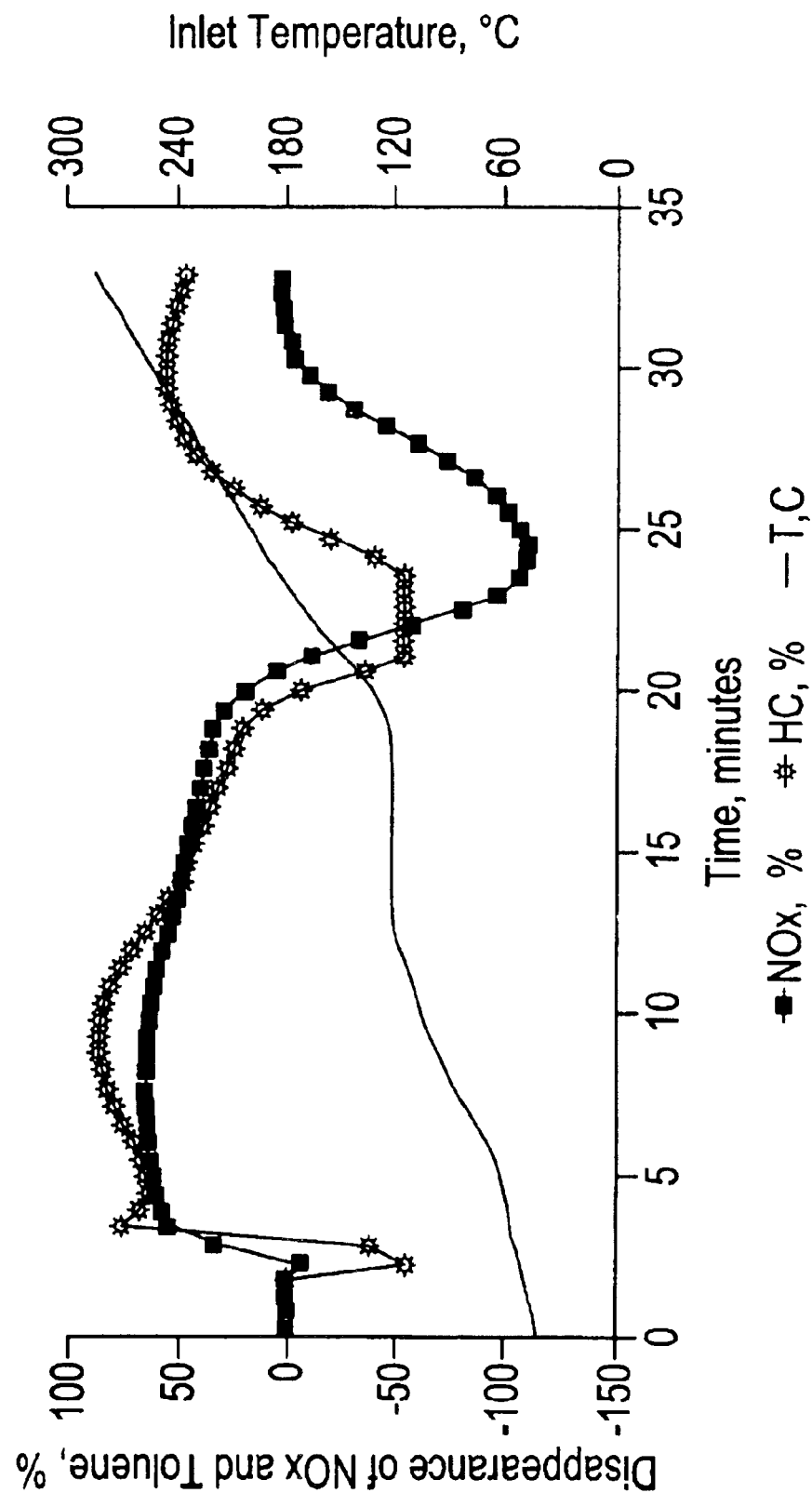
FIG. 8 illustrates the trapping and release of $NO_2$ by a carrier coated with a washcoat composition containing ETS-10 zeolite ion-exchanged with 3 wt. % manganese.

As seen in FIG. 8, the honeycomb monolith coated with the Mn/ETS-10 trap material adsorbs $NO_2$ from a gas stream containing $NO_2$ with an efficiency of 60% over a 10 minute period. The trapping efficiency was reduced as the trap became saturated, with trapping efficiency dropping to 0 after 20 minutes. The data clearly demonstrated that the trap material had high $NO_2$ trapping efficiency over a period of 20 minutes.

After saturation of the trap material, the temperature of the feed gas was increased at a rate of 13° C./min to a temperature of 450° C. NOx release was observed to occur at about 140° C., and regeneration of the trap was complete after less than 10 minutes at about 240° C. The rate of NOx release depended on the inlet temperature. Maximum NOx release efficiency of 100% over the Mn/ETS-10 was observed at 200° C. The release of the $NO_2$ and the regeneration of the trap were therefore demonstrated. The capability of the Mn/ETS-10 trap material to trap and release $NO_2$ was also demonstrated by performing several regeneration cycles over the same catalyst carrier.

Under the experimental conditions described above, and graphically depicted in FIGS. 7 and 8, the hydrocarbon toluene is also included in the test gas stream. The hydrocarbon, coincidentally, is also trapped and released by the zeolite trap under the conditions described in the experiments. In FIGS. 7 and 8, it can also be seen that the toluene was combusted at temperatures above about 180° C. At about 240° C., the combustion of the hydrocarbon appeared to be at a maximum. Thus, the combustion of the trapped hydrocarbons is demonstrated.

EXAMPLE 4

Storage and Release Properties of a 3% Co 3% Mn/ETS-10 Trap

3% Co 3% Mn/ETS-10 material was prepared and coated onto a monolith carrier as described in Example 1. The test gas composition contained water saturated air (about 1.5% water), 250 ppm $NO_2$, 1000 ppm toluene, 20 ppm $SO_2$, 15% $O_2$ and the balance was $N_2$. The space velocity of the gas feed was 30,000 $hr^{-1}$.

Figure 9:
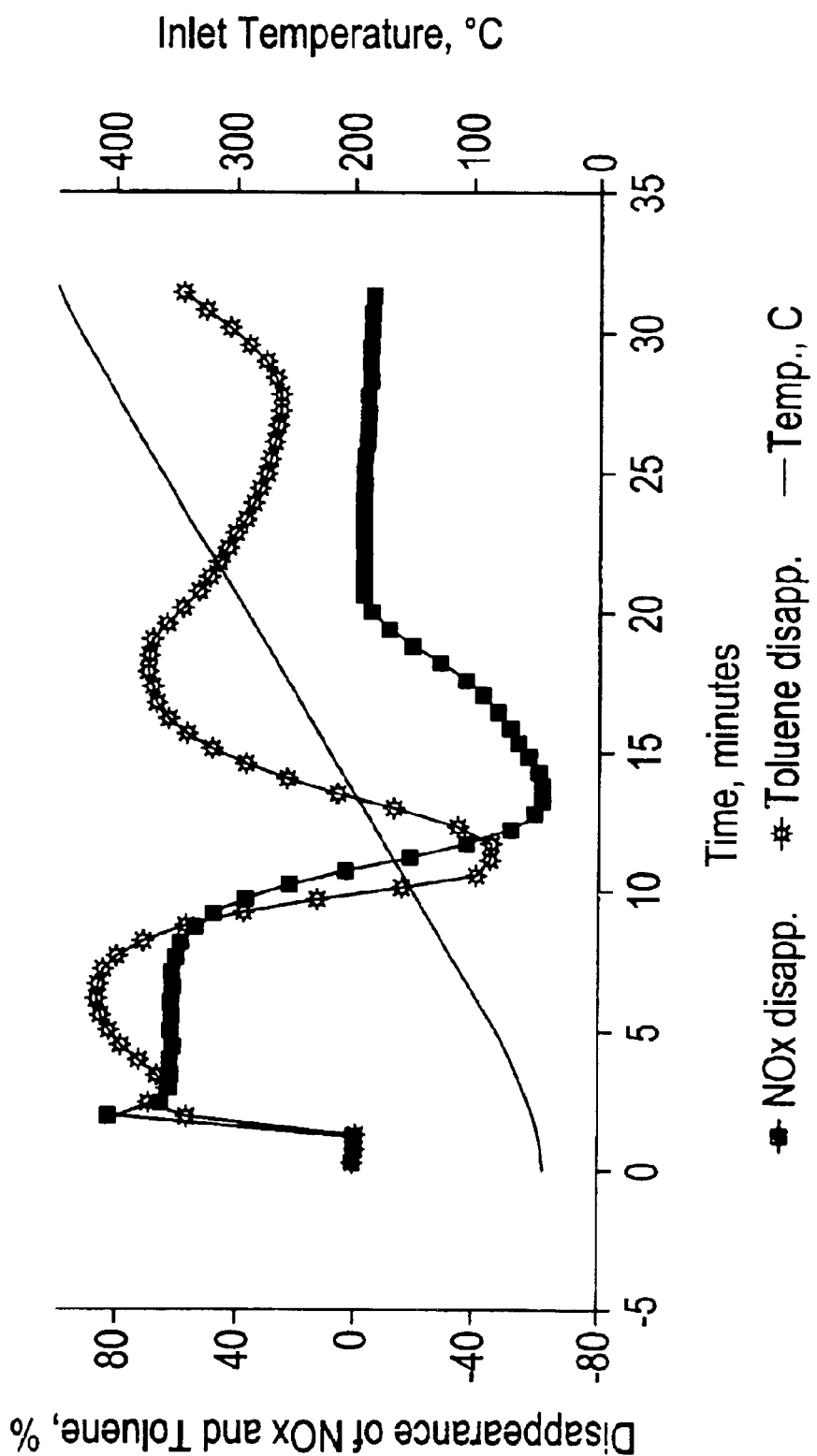
FIG. 9 illustrates the trapping and release of $NO_2$ by a carrier coated with a washcoat composition containing ETS-10 zeolite ion-exchanged with 3 wt. % cobalt and 3 wt. % manganese.

The trapping and release efficiencies of a CoMn/ETS-10 trap material coated on a honeycomb substrate from ambient (25° C.) to 450° C. is presented in FIG. 9. In FIG. 9, the left ordinate corresponds to the percentage disappearance of the NOx and toluene, the right ordinate corresponds to the inlet temperature and the abscissa corresponds to the time in minutes. The solid curve represents the inlet temperature, the curve containing squares represents the NOx, and the curve containing the circles represents the toluene.

Relative to the performance of the 3% Mn/ETS-10 material described in Example 3, the 3% Co 3% Mn/ETS-10 material had about the same $NO_2$ trapping efficiency, however, the temperature at which the $NO_2$ was released was increased from 140 to 160° C. As the temperature of the feed gas (containing water-saturated air, i.e., about 1.5% water) was raised at a rate of 13° C./minute, the $NO_2$ was trapped with an efficiency of 60% over 10 minutes (FIG. 9). The $NO_2$ trapping efficiency drops to 0 at 160° C. The $NO_2$ was released at temperatures greater than 160° C. with a maximum release efficiency of 70% (measured at −70%) occurring at 200° C. The trap was completely regenerated at about 300° C. The complete release of the $NO_2$ from the trap occured at temperature ranges that are practically achieved in diesel engine exhaust platforms. In diesel engine exhaust systems, the released $NO_2$ could be used, for example, to combust soot deposited on a soot filter.

Figure 10:
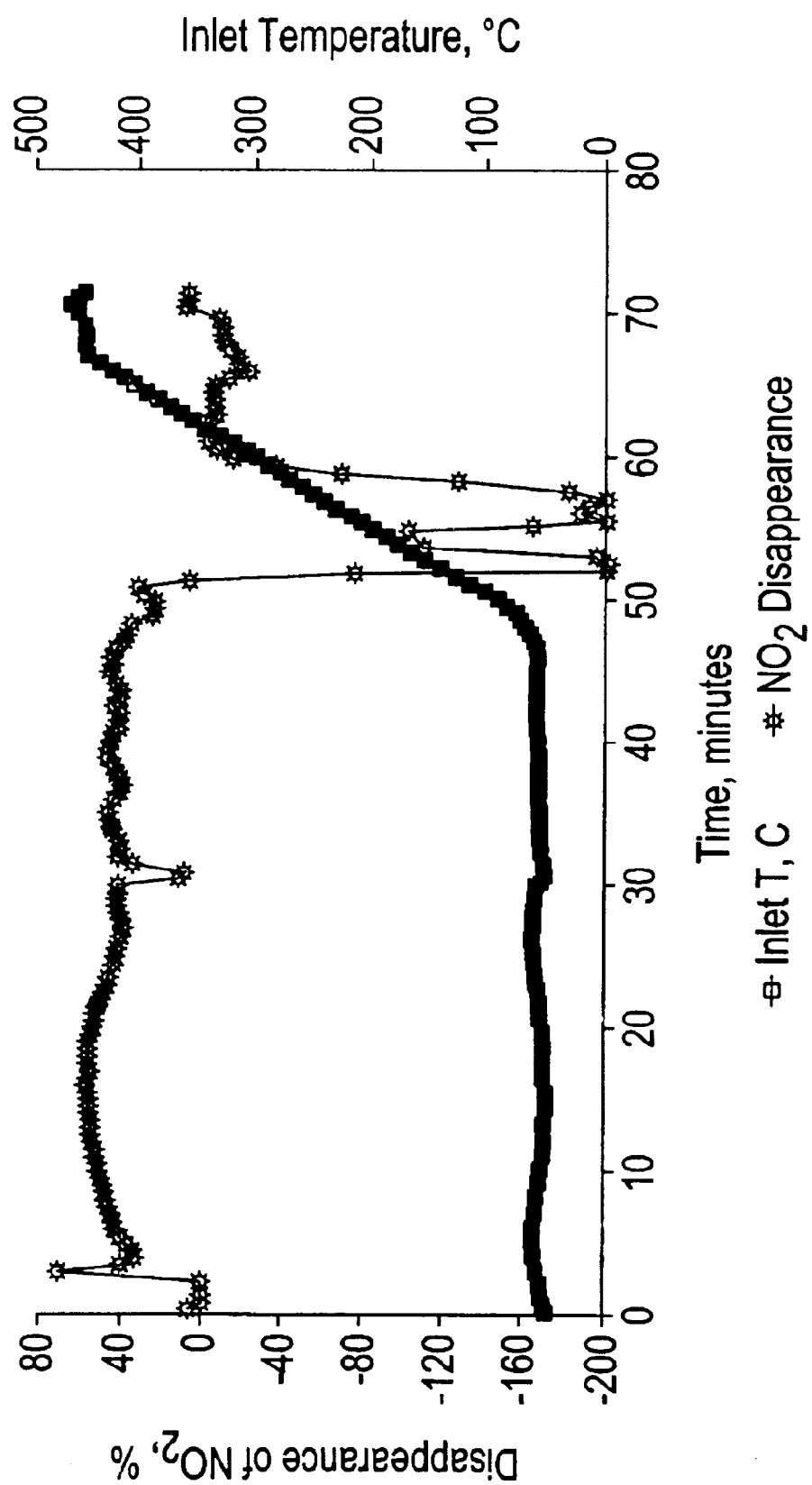
FIG. 10 illustrates the trapping and release of $NO_2$ by a carrier coated with a washcoat composition containing ETS-10 zeolite ion-exchanged with 3 wt. % cobalt and 3 wt. % manganese.

To demonstrate the $NO_2$ trapping capacity of the CoMn/ETS-10 trap, the same test gas composition containing 250 ppm of $NO_2$ was flown over the trap at about 70° C. The data obtained from the experiment is graphically presented in FIG. 10. In FIG. 10, the left ordinate corresponds to the percentage disappearance of the NOx, the right ordinate corresponds to the inlet temperature (in ° C.) and the abscissa corresponds to the time (in minutes). The curve composed of the squares represent the inlet temperature and the curve with the circles represent the $NO_2$.

The $NO_2$ trapping efficiency was about 40–50% of the inlet $NO_2$ for over 40 minutes. This data demonstrated the Co/Mn/ETS-10 material showed good trapping capacity. The stored $NO_2$ was released with increasing in reactor temperature and the $NO_2$ was completely released at 300° C. Here again, the properties of the CoMn/ETS-10 material appear to be well-suited for both the effective storage of $NO_2$, and release of the stored $NO_2$ at temperatures convenient to burn the soot trapped on a soot filter.

EXAMPLE 5

Storage and Release Properties of a 3% Mn/Y-Zeolite Trap

Figure 11:
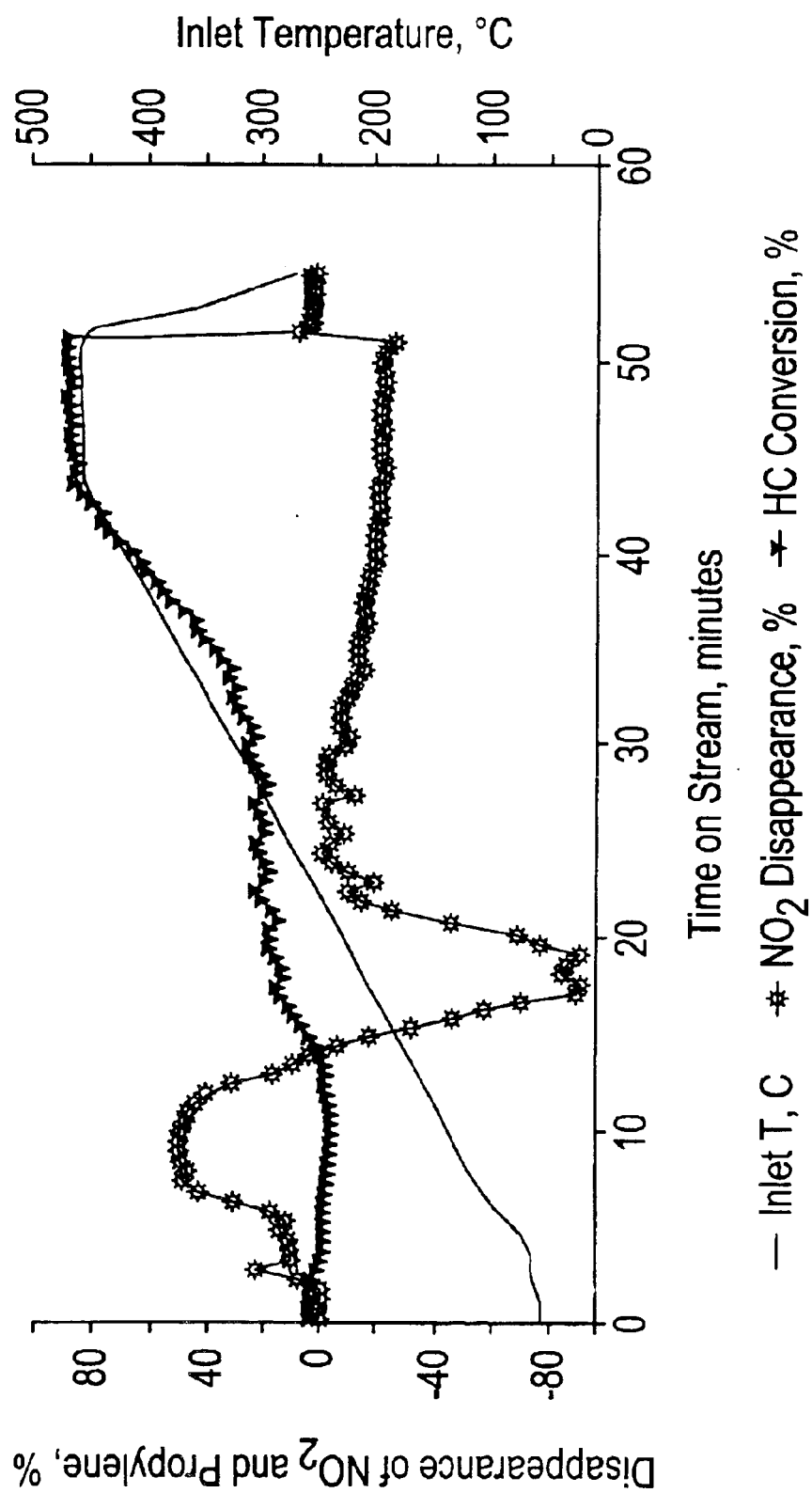
FIG. 11 illustrates the trapping and release of $NO_2$ by a carrier coated with a washcoat composition containing Y zeolite ion-exchanged with 3 wt. % manganese.

A monolith carrier coated with 3% Mn/Y-zeolite trap material was prepared according to Example 1. The trapping and release efficiencies of the 3% Mn/Y-zeolite trap material coated on a honeycomb substrate from ambient (25° C.) to 450° C. was examined, and the results are displayed in FIG. 11. The feed gas contained 250 ppm of $NO_2$, 333 ppm propylene, 25 ppm $SO_2$, and 10% steam, 12% $O_2$, and the balance was $N_2$. The space velocity was 25,000 $hr^{-1}$. The inlet temperature of the feed gas was increased at 13°/min from ambient to 450° C. In FIG. 11, the left ordinate corresponds to the percentage disappearance of the NOx and the propylene, the right ordinate corresponds to the inlet temperature (in ° C.) and the abscissa corresponds to the time (in minutes). The solid curve represents the inlet temperature, the curve containing the circles represents the NOx, and the curve containing the inverted triangles represents the propylene.

The $NO_2$ was trapped with an efficiency of 50% in the temperature range of 75 to 150° C. The $NO_2$ trapping efficiency drops to 0% at 170° C. The $NO_2$ was released at temperatures greater than 170° C. with a maximum release efficiency of 90% (measured at −90%) occurring at 200° C. The $NO_2$ storage and release properties of the 3% Mn/Y-zeolite trap material appear to be well-suited for the regeneration of a soot filter in a diesel engine exhaust system.

The disappearance of propylene was also measured during the experiment. No significant adsorption of propylene was observed at temperatures below about 180° C.

EXAMPLE 6

$NO_2$ Reduction Using a System Having an Upstream 3% Mn/Y-Zeolite Trap and a Downstream Pt/ZSM-5 Zeolite NOx Catalyst To demonstrate the effectiveness of a system containing both low temperature $NO_2$ trap material and a lean NOx catalyst composition effective for oxidizing a substrate with the released $NO_2$, the performance of a system containing two monolith carriers was determined. In this experiment, the monolith carrier coated with the 10% Mn/Y zeolite composition was placed upstream of a second monolith carrier coated with a washcoat composition of platinum exchanged on ZSM-5 zeolite material (referred to as Pt/ZSM-5 material). The Pt/ZSM-5 catalyst was prepared as follows: 11.7 g of platinum hydroxide as amine solubilized monoethanolamine platinum complex $(MEA)_x Pt(OH)_6$ was diluted in water to a total solution weight of 156 g. ZSM-5 was added and mixed for about 30 minutes. 15 g of acetic acid and 30.29 g of silica sol (Nalco 1056) was added as binder. The slurry was ballmilled until a slurry having 90% of the particles with a particle size of less than 10 microns was achieved. A ceramic substrate of 0.5 in×1.0 in dimension was coated with the slurry to a level of about 2 $g/in^3$ by applying the slurry twice, drying and calcining in between. The coated catalyst was then dried and calcined at 550° C. for 2 hours.

Figure 12:
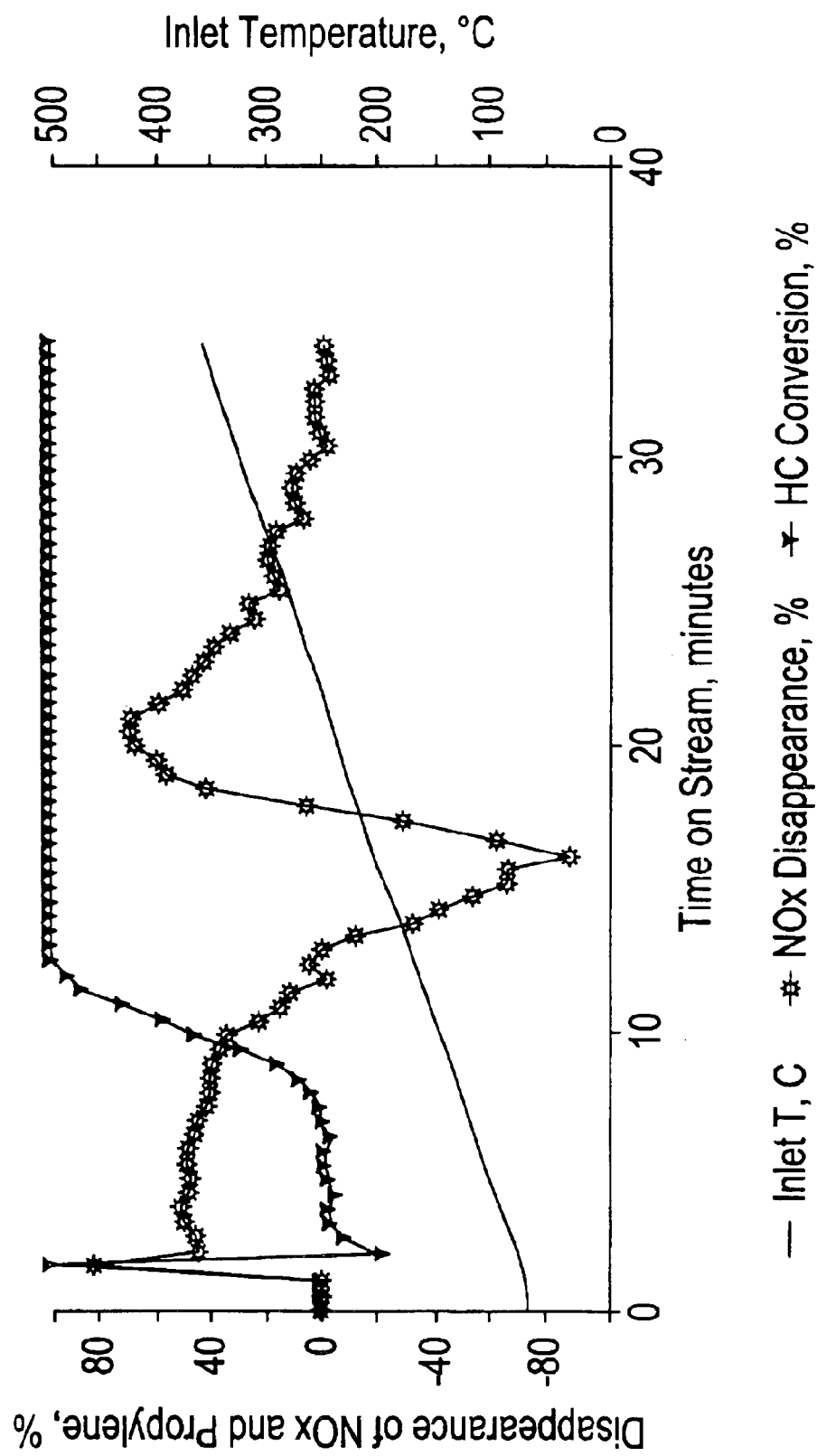
FIG. 12 illustrates the trapping and reduction of $NO_2$ in a system containing a low temperature $NO_2$ trap and a lean NOx catalyst.

The system was exposed to a test gas composition with a space velocity of 25,000 $hr^{-1}$. The test gas composition was composed of 250 ppm $NO_2$, 1000 ppm propylene, 25 ppm $SO_2$, 10% steam, 10% $O_2$, and the balance was nitrogen. The results of the experiment are graphically represented in FIG. 12, the left ordinate corresponds to the percentage disappearance of the NOx and the propylene, the right ordinate corresponds to the inlet temperature (in ° C.) and the abscissa displays the time (in minutes). The solid line represents the inlet temperature, the line with the circles shows the $NO_2$ disappearance and the line with the inverted triangles shows the propylene disappearance.

In this configuration, the $NO_2$ disappearance was better than 40% in the temperature range of 70 to 150° C. As temperature increased, some of the trapped $NO_2$ was released. At 200° C., the released $NO_2$ was reduced.

This experiment demonstrates the ability of the released $NO_2$ to be successfully used as an oxidant to oxidize a substrate material (in this case, propylene) at temperature ranges above 200° C. When the $NO_2$ trap material is incorporated into an exhaust system containing a soot filter, the $NO_2$ released could be utilized to oxidize the soot deposited on a soot filter.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A diesel engine exhaust system comprising:

a soot filter; and low temperature $NO_2$ trap material comprising zeolites selected from the group consisting of acidic zeolites and base metal-exchanged zeolites, and wherein the low temperature $NO_2$ trap material is deposited on a carrier upstream and in train with the soot filter; and wherein the low temperature $NO_2$ trap material adsorbs $NO_2$ at lower temperatures and releases the $NO_2$ at higher temperatures to regenerate the $NO_2$ trap material.

2. The exhaust system of claim 1, wherein the zeolites are selected from the group consisting of ZSM-5, ETS-10, Y zeolite, Beta zeolite, ferrierite, mordenite, titanium silicates, and aluminum phosphates.

3. The exhaust system of claim 1, wherein the base metals are selected from the group consisting of Mn, Cu, Fe, Co, W, Re, Sn, Ag, Zn, Mg, Li, Na, K, Cs, Nd, Pr and combinations thereof.

4. The exhaust system of claim 1, wherein the zeolites comprise a trivalent metal which in combination with Si forms an oxidic skeleton.

5. The exhaust system of claim 4, wherein the trivalent metal comprises at least one metal selected from the group consisting of Al, B, Ga, In, Fe, Cr, V, As and Sb.

6. The exhaust system of claim 4, wherein the zeolites comprise three-dimensional alumina-silicate zeolites characterized by pore openings whose smallest cross-section dimensions are at least 5 Angstroms and having a silicon to alumina ratio of at least 5.

7. The exhaust system of claim 4, wherein the zeolites comprise titanium silicates.

8. The exhaust system of claim 1, further comprising a diesel oxidation catalyst upstream of the soot filter.

9. The exhaust system of claim 8, wherein the $NO_2$ trap material is deposited on a carrier that is interposed and in train with the diesel oxidation catalyst and the soot filter.

10. The exhaust system of claim 9, further comprising a canister, wherein the canister houses both the low temperature $NO_2$ trap material and the soot filter.

11. The exhaust system of claim 1, wherein the soot filter comprises a ceramic monolithic structure having an upstream axial end and a downstream axial end, the structure having parallel flow channels with macroporous walls, wherein the channels having an opening at the upstream axial end are closed at the downstream axial end, and the channels having an opening at the downstream axial end are closed at the upstream axial end, thereby defining upstream and downstream sides of the channel walls.

12. The exhaust system of claim 11, wherein a catalyst composition is deposited on the downstream side of the channel walls of the soot filter.

13. The exhaust system of claim 12, wherein the catalyst composition, deposited on the downstream side of the channel walls of the soot filter, comprises a lean NOx catalyst composition.

14. The exhaust system of claim 12, wherein the catalyst composition, deposited on the downstream side of the channel walls of the soot filter, comprises a catalyst composition effective for the combustion of unburned hydrocarbons and carbon monoxide.

15. A method of treating a diesel exhaust stream containing $NO_2$ and soot, comprising:

passing the exhaust stream through the exhaust system of claim 1;

adsorbing at least some of the $NO_2$ onto the low temperature $NO_2$ trap material and at least some of the soot onto the soot filter;

heating the low temperature $NO_2$ trap material to desorb at least some of the adsorbed $NO_2$ from the low temperature $NO_2$ trap material; and oxidizing at least some of the adsorbed soot with the desorbed $NO_2$.

16. A method of treating a diesel exhaust stream containing $NO_2$ and unburned hydrocarbons, comprising:

passing the exhaust stream through a diesel engine exhaust system comprising a soot filter and low temperature $NO_2$ trap material deposited on a carrier upstream of the soot filter;

adsorbing at least some of the $NO_2$ onto the low temperature $NO_2$ trap material and at least some of the unburned hydrocarbons onto the low temperature $NO_2$ trap material;

heating the $NO_2$ trap material to desorb at least some of the adsorbed $NO_2$ and some of the unburned hydrocarbons from the low temperature $NO_2$ trap material; and oxidizing at least some of the unburned hydrocarbons with the desorbed $NO_2$;

wherein the low temperature $NO_2$ trap material comprises zeolites selected from the group consisting of acidic zeolites and base-metal exchanged zeolites.

17. The method of claim 16, wherein the exhaust system further comprises a lean NOx catalyst deposited on the soot filter.

18. The method of claim 15, wherein the low temperature $NO_2$ trap material adsorbs $NO_2$ at 25 to 200° C. and releases the $NO_2$ above 175° C. to regenerate the $NO_2$ trap material.

19. The method of claim 18, wherein the low temperature $NO_2$ trap material adsorbs $NO_2$ at 25 to 130° C. and releases the $NO_2$ above 175° C. to regenerate the $NO_2$ trap material.

* * * * *